United States Patent [19]

Van Os

[11] Patent Number: 5,092,671
[45] Date of Patent: Mar. 3, 1992

[54] DEVICE FOR PROJECTION TELEVISION PICTURES

[75] Inventor: Petrus J. M. Van Os, Eindhoven, Netherlands

[73] Assignee: U.S. Philips Corporation, New York, N.Y.

[21] Appl. No.: 644,182

[22] Filed: Jan. 18, 1991

[30] Foreign Application Priority Data

Jan. 18, 1990 [NL] Netherlands .......................... 9000115

[51] Int. Cl.⁵ .............................................. G03B 21/14
[52] U.S. Cl. ...................................... 353/31; 353/119; 353/122; 353/DIG. 5
[58] Field of Search ................... 353/30, 31, 122, 119, 353/DIG. 5, 121; 248/918, 919, 920, 921, 922, 917

[56] References Cited

U.S. PATENT DOCUMENTS

| | | | |
|---|---|---|---|
| 3,895,866 | 7/1975 | de Quervain | 353/120 |
| 4,906,071 | 3/1990 | Takahara et al. | 353/122 |
| 4,963,001 | 10/1990 | Miyajima | 353/119 |

Primary Examiner—William A. Cuchlinski, Jr.
Assistant Examiner—William C. Dowling
Attorney, Agent, or Firm—John C. Fox

[57] ABSTRACT

The invention relates to a device for projecting television pictures, provided with three LCD channels, the LCDs mounted to a common support member, relative to which one of the LCDs occupies a fixed position, whereas the two other LCDs are each connected to the support member by means of three adjustment members. Each adjustment member is so designed that a movement parallel to the direction of movement of the light through the relevant LCD as well as a movement perpendicular to this direction can be achieved by means of the adjustment member at its coupling point.

24 Claims, 3 Drawing Sheets

DEVICE FOR PROJECTION TELEVISION PICTURES

BACKGROUND OF THE INVENTION

The invention relates to a device for projecting television pictures, provided with a light source and dichroic mirrors which separate the light into three channels, the light being guided through an LCD in each channel, after which the light transmitted by the LCDs in the different channels is united by means of dichroic mirrors into a single channel to be supplied to a projection system.

TV projection systems are in development in which the light coming from a light source is separated into different colour components, such a red, green and blue, in three separate channels by means of dichroic mirrors.

The light beams of different colours running in different channels and obtained in this way are then conducted through liquid crystal display units having two polaroids (referred to as LCDs hereinafter), which are known per se. The LCDs are controlled by control means which are known per se, which are immaterial to the invention, and which will therefore not be described any further, in such a way that only desired portions of the light beams are transmitted in the various channels to form, for example, monochrome components of a color image. The light beams thus transmitted by the LCDs are merged together again by means of dichroic mirrors into a single channel, and the combined light beam thus obtained is eventually fed to a projection system for projecting the desired picture.

The LCDs are generally mounted to a common support member or housing in which the dichroic mirrors used for combining the light beams are also positioned.

OBJECTS AND SUMMARY OF THE INVENTION

It is an object of the invention that the pictures formed by the three separate LCDs by means of the transmitted light should be projected in the correct manner, overlapping one another in order to achieve a sharp and clear picture. For this purpose, it is another object of the invention that the LCDs are correctly aligned relative to one another during the assembly of the device.

According to the invention these objects can be achieved in that the LCDs are mounted to a common support member, relative to which one of the LCDs occupies a fixed position, while the two other LCDs are each connected to the support member by means of three adjustment members, making contact with the relevant LCD at three coupling points which, as seen in the direction of movement of the light through the relevant LCD, are staggered through subsequent angles of 90° relative to one another. Each adjustment member is so designed that a movement parallel or perpendicular to the direction of movement of the light through the relevant LCD can be realised by means of the adjustment member at its coupling point.

When the construction according to the invention is used, the LCD fixedly connected to the support member may be used as a reference member, relative to which the other LCDs are brought into the correct position by means of the adjustment members coupled to the relevant LCDs. It has been found in practice that an accurate alignment of the LCDs can be achieved in this way, so that the separate pictures formed at the LCDs can be projected over one another in the correct manner.

A further aspect of the invention relates to a device for fixing a disc-shaped member relative to a plate-shaped wall portion of a support member enclosing the disc-shaped member. In the mounting of disc-shaped members, particularly in the fastening of mirrors, such as, for example, those used in the projection device described above, it is important that the disc-shaped member or mirror can be fixed in the desired position in a simple manner.

According to the invention, this can be achieved in that a slot is provided in the plate-shaped wall portion for accommodating the disc-shaped member, and in that an oblong, finger-shaped member is stamped from the plate-shaped wall portion at the level of the slot in such a way that this finger-shaped member is connected to the remaining portion of the plate-shaped wall portion only with one end and, between its ends, with two connection parts which enclose an angle with one another. When the construction according to the invention is used, the disc-shaped member or mirror can be inserted in the slot and a swivel movement of the finger-shaped member can be achieved through deformation of the two connection parts enclosing an angle with one another, in such a way that the free end of the said finger-shaped member presses the disc-shaped member against the bounding edge of the slot positioned opposite the free end of the finger-shaped member. A fixation of the disc-shaped member relative to the plate-shaped wall portion is thereby obtained in a simple manner owing to the permanent deformation of the connection parts enclosing an angle with one another without additional fastening means, which often form inconvenient obstacles.

The invention will be explained in more detail below with reference to a possible embodiment of the construction according to the invention as pictured in the accompanying Figures.

DESCRIPTION OF THE PREFERRED EMBODIMENTS

Figure 1:
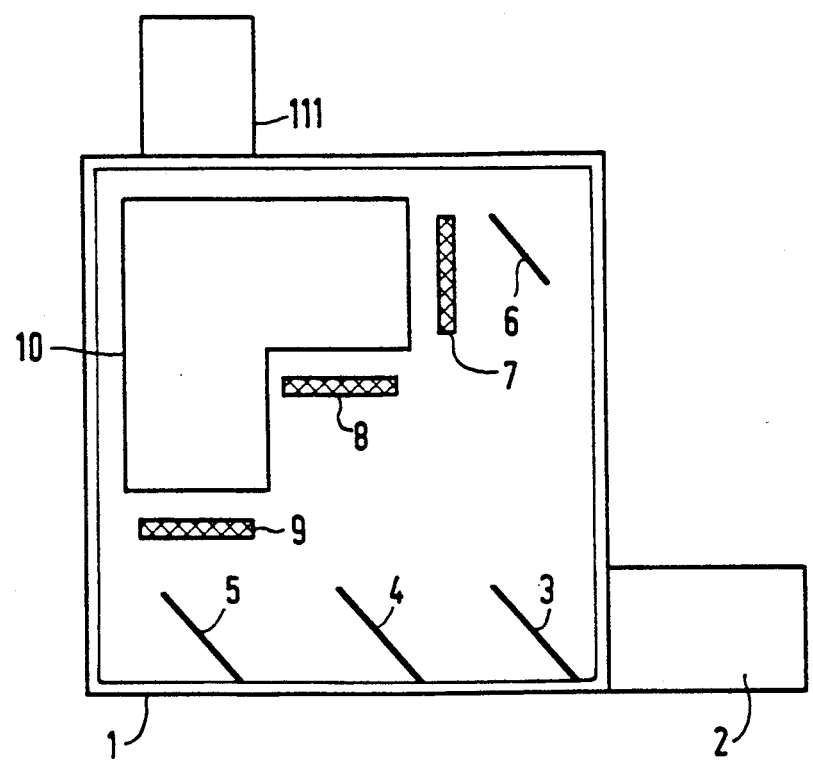
FIG. 1 shows diagrammatically an embodiment of a device according to the invention, partly in elevation and partly in cross-section.

FIG. 1 shows a rectangular housing 1 to whose side wall a lamp housing 2 is mounted, by means of which light can be radiated into the interior of the housing through an opening provided in the relevant wall. Three dichroic mirrors 3, 4 and 5 are positioned one after the other in the main housing 1 in the light path of lamp housing 2. In known manner, these mirrors transmit only part of the incident light, while as seen in FIG. 1, part of the light incident on the mirrors in horizontal direction from the lamp housing 2 is deflected in vertical direction so that, for example, an upwardly directed channel of blue light is formed at mirror 3, an upwardly directed channel of green light is formed at mirror 4, and an upwardly directed channel of red light is formed at mirror 5.

The light coming from the mirror 3 is deflected by a further mirror in the direction of a lens 7. The light deflected by the mirrors 4 and 5 is incident on lenses 8 and 9, respectively.

As is evident from FIG. 1, the parallel centrelines of the lenses 8 and 9 extend in a direction perpendicular to the centreline of the lens 7. The lenses 7, 8 and 9 are positioned near wall portions $W_a$, $W_b$, $W_c$ of an interior housing 10 which is accommodated in the housing 1 and has a more or less L-shaped construction, which wall portions extend parallel to the said lenses. In this housing 10, also called the recombination housing, the light beams transmitted by the lenses 7, 8 and 9 in the housing are joined together again in a way yet to be described below and supplied as a single beam to a projection system 111 mounted to the main housing 1, with which system a picture can be projected.

Figure 2:
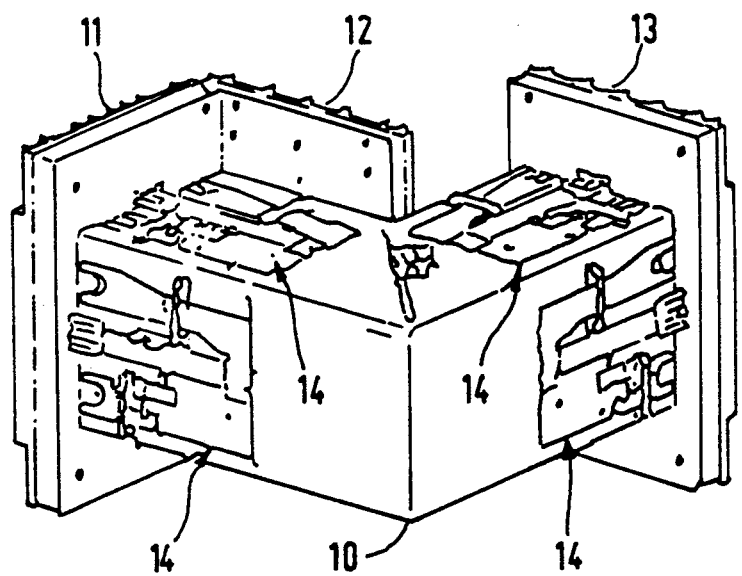
FIG. 2 shows diagrammatically a perspective view of a housing with LCDs and adjustment members for the LCDs mounted to it.

As is shown diagrammatically in FIG. 2, LCDs 11-13 are mounted to the wall portions $W_a$, $W_b$, $W_c$ of the recombination housing 10 situated opposite the lenses 7-9. The LCD 12 situated opposite the lens 8 occupies a fixed position relative to the housing 10, whereas the LCDs 11 and 13 are adjustable relative to the housing by means of adjustment members 14. Three adjustment members 14 are provided for the LCD 11 as well as for the LCD 13, which members are provided on three outer walls of the housing 10, which members enclose subsequent angles of 90° with one another.

An embodiment of an adjustment member 14 will be explained in greater detail below with reference to FIGS. 3-6. The adjustment member comprises a first elongate leg 15 in whose free end a U-shaped recess 16 is provided.

From the end comprising the recess 16, the width of the leg gradually decreases in the direction of a rectangular intermediate portion 17 of the leg, which portion is slightly depressed relative to the portions of the leg 15 situated on either side of it.

The remaining portion of the leg 15 again gradually increases in width and at one side adjoins a connection piece 18, which at its side facing away from the leg 15 adjoins a substantially rectangular plate-shape portion 19. As is particularly apparent from FIG. 5, the connection piece 18 is slightly depressed relative to the portions 15 and 19 which are integral with it and are situated on either side of it.

By means of a connection ridge 20, whose width is considerably smaller than that of the connection piece 18, the connection piece 18 is connected to the end of a leg 21 which extends substantially parallel to the leg 15 between the leg 15 and the plate-shape portion 19, and whose width is approximately equal to the width of the connection piece 18.

By means of a connection ridge 22, whose dimensions correspond to those of the connection ridge 20, the free end of the leg 21 is connected to a substantially U-shaped coupling piece 23, which is situated at approximately the same level as the free end of the leg 15 provided with the U-shaped recess 16.

The leg 21 is in one plane with the portion 18 and will thus lie at a distance from the wall of the housing 10 in the assembled state.

Figure 3:
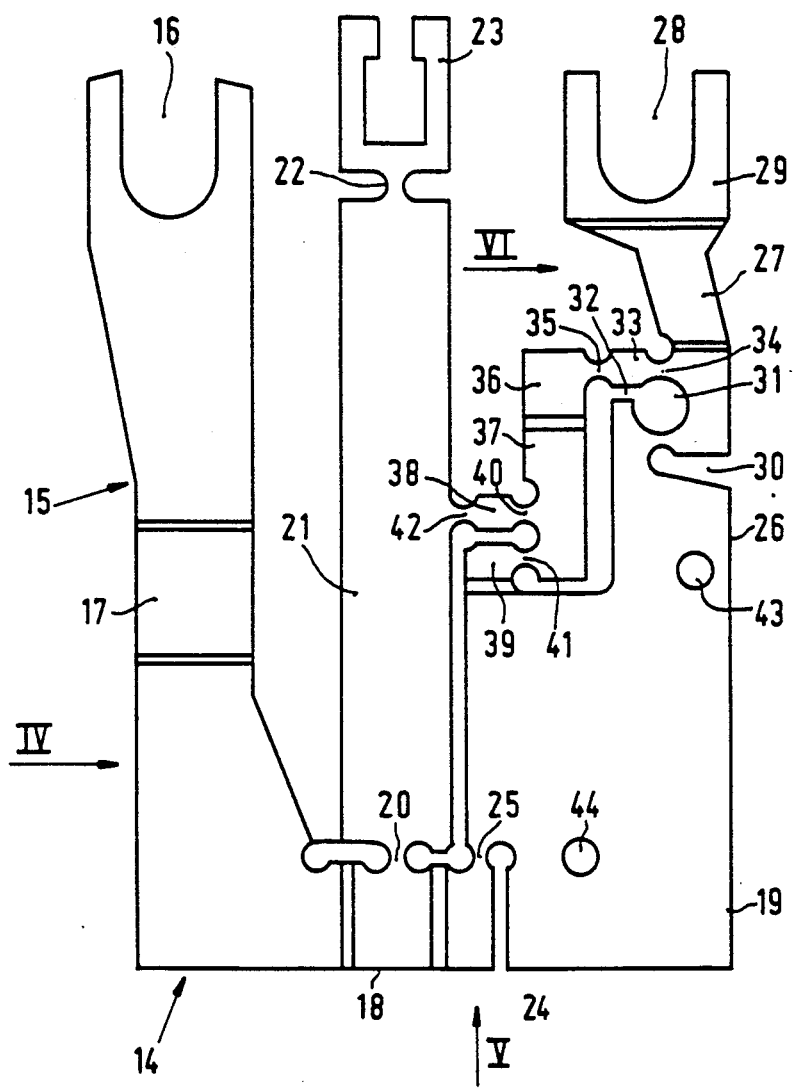
FIG. 3 shows a plan view of an embodiment of an adjustment member according to the invention.
Figure 4:
FIG. 4 shows a side elevation view of FIG. 3 along the arrow IV in FIG. 3.
Figure 5:
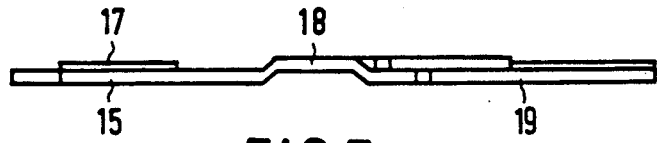
FIG. 5 shows an elevation of FIG. 3 viewed along the arrow V in FIG. 3.
Figure 6:
FIG. 6 shows part of the adjustment member represented in FIG. 3 viewed along the arrow VI in FIG. 3.

As is further apparent from FIG. 3, a slot 24 extending parallel to the longitudinal direction of the connection piece is provided in the plate-shaped portion 19 near the connection piece 18, so that the plate-shaped portion is in fact only connected to the connection piece via a connection ridge 25, whose dimensions correspond to those of the connection ridges 20 and 22.

At its side facing away from the leg 21, the plate-shape portion has an extension 26 merging into an arm 27, which arm forms a connection between the end of the extension 26 and a plate portion 29 provided with a U-shaped recess 28. As is particularly apparent from FIG. 6, the arm 27 is slightly depressed relative to the portions 29 and 26 situated on either side of it.

A wedge-shaped opening 30 extending from a side of the extension 26 in the direction of the arm 21 is provided in the extension 26. Above this wedge-shaped opening 30, a circular hole 31 is formed in the extension 26, which hole merges into a slot 32 which extends from the boundary of the extension 26 facing the leg 21 to the hole 31. A connection piece 33 is formed in this way, connected at one end to the end of the extension 26 by means of a connection ridge 34 of small cross-section and at its other end to the end of a connection arm, which is built up of two portions 36 and 37 offset relative to one another, by means of a connection ridge 35 of small cross-section. The portion 37 here lies in one plane with the depressed portions 18 and 21.

Two further connection pieces 38 and 39 merge into the end of the connection arm 36, 37 remote from the connection piece 33 via connection ridges 40 and 41, respectively, of comparatively small cross-section at the side of the connection arm facing away from the connection piece 33.

The connection piece 38 is connected to a side of the arm 21 near the centre of this arm by means of a further connection ridge 42 of small cross-section.

The connection piece 39 is connected to an edge of the plate-shaped portion 19 along an edge which extends perpendicularly to the arm 21.

Figure 7:
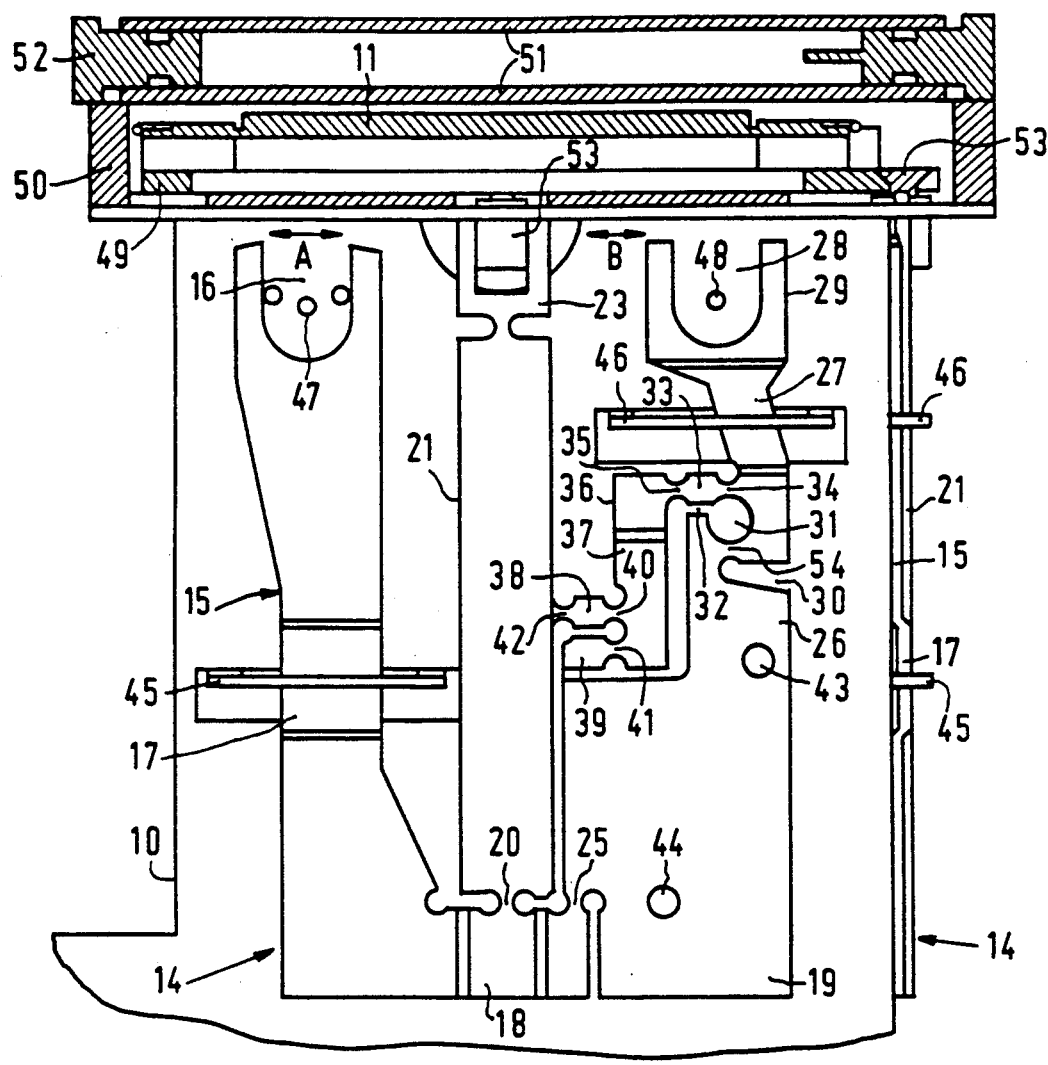
FIG. 7 shows part of the housing represented in FIG. 2 on a larger scale, partly in plan view and partly in cross-section.

The plate-shaped portion 19 further accommodates two holes 43 and 44 through which screws, rivets, or the like can be inserted, by means of which the plate-shaped section 19 of the adjustment member 14 manufactured from a plate-shaped piece of material may be mounted to a wall of the housing 10 in the manner represented in FIGS. 2 and 7.

The arrangement is such for this purpose that the depressed portion 17 is situated below a U-shaped bracket 45 which straddles this depressed portion 17 and is integral with the wall of the housing 10, against which bracket the depressed portion 17 is forcably pressed owing to the shape of the adjustment member 14. In a similar way, the depressed arm 27 is situated below a U-shaped bracket 46 which is integral with the wall of the housing 10, against which bracket the arm 27 is also forcibly pressed. Furthermore, one or several bores 47, 48, respectively, is/are provided in the wall of the housing 10 at the level of the U-shaped recesses 16 and 28 for a purpose yet to be described below.

As is further apparent from FIG. 7, an adjustable LCD 11 is connected to a connection plate 49 which is surrounded by a dust rising 50. At the side facing away from the housing 10, the LCD is further screened with transparent cover plates 51 mounted to a cooling frame 52. The connection plate 49 is coupled to the relevant three adjustment members 14 by means of bolts 53 which are inserted through the holes provided in the connection plate and screwed into the U-shaped coupling pieces 23, so that the connection plate, and thus the relevant LCD 11 is supported in three coupling points by adjustment members 14, the coupling points being positioned at subsequent angles of 90° relative to one another seen in the direction in which a light beam moves through the LCD.

Since the adjustment members 14 are provided on the outside of the housing 10, they are easily accessible.

To carry out an adjustment of the coupling point between an adjustment member 14 and the connection plate 49 supporting an LCD, which coupling point is formed by a bolt 53, the end of the arm 15 comprising the recess 16 is shifted to the left or to the right as shown with arrow A and/or the plate portion 29 comprising the recess 28 is shifted to the left or to the right as shown with arrow B.

Such a displacement can be achieved by means of a peg whose diameter corresponds approximately to the width of the recess 16 or 28. A pin is provided at the bottom end of this peg in a position eccentric relative to the centreline of the peg and fitting in the bores 47 and 48.

It will be clear that, when the pin is inserted into the of the bores 47 or 48 so that the bottom end of the peg carrying the pin lies between the legs bounding the recess 16 or 48, and the peg is then rotated about the centreline of the pin, the end of the arm 15 or the plate-shaped portion 29 will be displaced in one of the two directions represented by the arrow A or the arrow B, respectively, as seen in FIG. 7.

When the free end of the arm 15 is displaced in the direction of arrow A, the arm 15 will rotate relative to the remaining portion of the adjustment member 14 about a pivot point formed by the connection ridge 25. The rotation about the pivot point 25 displaces the connection piece 18 and the leg 21 connected to it at least substantially in longitudinal direction of this leg 21, which movement of the leg 21 is made possible in that a hinging movement can also occur in the connection ridges 40 and 42. It will be obvious that a displacement of the leg 21 in its longitudinal direction leads to a corresponding displacement of the coupling point by which the leg 21 is coupled to the connection plate 49 supporting the relevant LCD.

Owing to the frictional force generated between the depressed portion 17 and the bracket 45, the leg 15, and thus the leg 21 and the coupling point between this leg 21 and the connection plate 49 will remain in a once set position.

If the plate portion 29 is shifted in one of the two directions of arrow B, this plate portion together with the arm 27 will swivel about a pivot point formed by connection ridge 54 between the hole 31 and the inner end of the wedge-shaped opening 30. This movement of the arm 27 is transmitted by the connection piece 33 to the connection arm 36, 37, which will consequently swivel about the pivot point formed by the connection ridge 41. This swivel movement of the arm 36, 37 is transmitted again by the connection piece 38 to the leg 21, so that this leg 21 will swivel about the pivot point formed by the connection ridge 20. It will be clear that such a swivel movement of the arm 21 at the coupling point formed by the bolt 53 will lead to a displacement of the connection plate 49 supporting the LCD in a direction perpendicular to the longitudinal direction of the arm 21. Here, too, the once set position of the arm 27, and thus the set position of the parts connected to the arm 27, will be maintained by the frictional force generated between the arm 27 and the bracket 46.

The use of the adjustment member renders it possible to achieve a displacement in two mutually perpendicular directions at the location of the coupling point between the adjustment member 14 and a connection plate 49 supporting a relevant LCD. Since each connection plate 49 supporting an LCD is connected to three adjustment members 14 in three points shifted 90° relative to one another, such a displacement can be achieved in two mutually perpendicular directions in these three points, so that it is possible to set the relevant LCD in any desired position. Thus it is possible to adjust the two adjustable LCDs in such a way that the pictures formed in these LCDs will coincide correctly with the picture formed by the LCD with fixed position, which serves as a reference.

Thanks to the plate-shaped design of the adjustment member 14, this adjustment member will occupy little space and thus contribute to the compactness of the construction of the device in which the adjustment member is used. Furthermore, the design of the adjustment member 14 enables displacement of the free end of the leg 15 to cause a considerably smaller displacement of the leg 21 in its longitudinal direction; in the embodiment shown, the ratio of these displacements is approximately 1:10. The displacement of the plate-shaped portion 29 in the direction of arrow B in the chosen embodiment of the adjustment member 14 also results in a considerably smaller displacement of the coupling piece 23; in the embodiment shown the ratio of these displacements is approximately 1:10.

Figure 8:
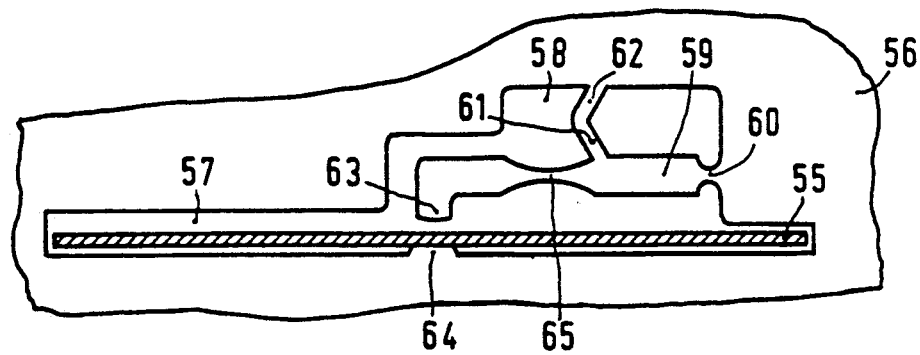
FIG. 8 shows the fastening of a disc-shaped member in a plate-shaped wall portion.

In addition, FIG. 8 shows diagrammatically the way in which an edge of a disc-shaped member, such as a mirror 55, may be fixed in a plate-shaped wall 56 of a housing. The boundary of the mirror 55 facing away from the wall 56 may, for example, be inserted in brackets or the like which are fastened to a side wall of the relevant housing situated opposite the wall 56.

As is shown in FIG. 8, the mirror 55 is inserted in a slot 57 provided in the wall 56. A recess 58 provided in the wall 56 merges into this slot. In this recess is present a finger-shaped member 59 which is integral with the wall 56 and of which only one end is connected to the remaining portion of the plate-shaped member 56 by means of a connection ridge 60. Between its ends, the finger-shaped member 59 is further connected to the plate-shaped portion by means of two connection parts 61 and 62 which together enclose an angle and which are also integral with the finger-shaped member 59 and the wall 56. The finger-shaped member is provided with a nose 63 extending towards the mirror 55 at its free end facing away from the connection ridge 60. This nose 63 is situated opposite a projection 64 of the boundary of the slot 57, which lies at the side of the mirror 55 facing away from the nose 63.

That portion of the finger-shaped member 59 which is situated between the connection parts 61 and 62 enclosing an angle with one another on the one hand and the projecting nose 63 on the other hand is of a narrower design over part 65 of its length than the remaining part of the finger-shaped member 59.

The finger-shaped member 59 with its associated parts will initially be stamped out from the material of the wall 56 in the shape represented in FIG. 8. After insertion of the mirror 55, the two connection pieces enclosing an angle can be deformed with a suitable tool in such a way that the angle enclosed by these parts 61 and 62 will become greater. As a result the finger-shaped member 59 will swivel relative to the wall 56 about the pivot point formed by the connection ridge 60. Thus, the nose 63 will be forced towards the mirror 55, so that the mirror 55 is clamped between the nose 63 and the projection 64. Owing to the narrower portion 65 of the finger-shaped member 59, the finger-shaped member 59 will possess a certain resilience, by which the exertion of undesirably high forces on the mirror 55 is prevented.

It will be clear that a fixation of the rim of the mirror 55 present in the slot 57 of the wall 56 can be quickly and effectively achieved in this way without loose and-/or projecting components being required, so that an inexpensive and compact design is obtained.

I claim:

1. A device for projecting television pictures comprising a light source, dichroic mirrors which separate the light into three channels, three LCDs, means for guiding the light through an LCD in each channel, means for recombining the light transmitted by the LCDs in the different channels, and a projection system, characterized in that the LCDs are mounted on a common support member, one of the LCDs occupying a fixed position while the two other LCDs are each connected to the common support member by three adjustment members, each adjustment member making contact with the relevant LCD at a coupling point, the three coupling points, seen in the direction of movement of the light through the relevant LCD, being staggered through subsequent angles of 90° relative to one another, each adjustment member capable of achieving a movement of the LCD parallel and perpendicular to the direction of movement of the light through the relevant LCD.

2. A device as claimed in claim 1, characterized in that the support member comprises a housing having walls and provided with openings at the level at which the LCDs are positioned, and that the adjustment members are mounted to the outside of the walls.

3. A device as claimed in claim 1, characterized in that the adjustment member is provided with an arm which extends at least substantially parallel to the direction of movement of the light through the LCD, the arm being coupled at one end to the relevant LCD, the arm capable of being shifted lengthwise and swivelled about a pivot axis perpendicular to the longitudinal direction of the arm.

4. A device as claimed in claim 3, characterized in that the adjustment member is plate-shaped and the arm is connected to a second arm, which extends parallel to the arm, at its end remote from the end connected to the LCD, the remote end of the arm also connected to a portion of the adjustment member by means of a connection ridge forming a pivot, while the free end of the second arm is provided with means by which the second arm can be displaced perpendicularly to its longitudinal direction.

5. A device as claimed in claim 4, characterized in that a bracket is connected to the housing, the second arm is provided with a depressed portion which bears with pressure on the bracket which straddles the second arm.

6. A device as claimed in claim 4, characterized in that the adjustment member is provided with a third arm at the side of the arm, facing away from the second arm, which third arm is connected to the portion of the adjustment member fixedly connected to the housing by a connection ridge forming a pivot, and which third arm is also coupled to the arm connected to the LCD between the ends of the arm by means of connecting parts forming part of the adjustment member.

7. A device as claimed in claim 6, characterized in that a second bracket is fastened to the housing, the third arm is provided with a depressed portion which bears with pressure on a bracket which straddles the third arm.

8. A device as claimed in claim 6, characterized in that the third arm is connected to one end of a fourth arm by a connection piece with hinging capability, which fourth arm is situated between the third arm and the arm, while the other end of the fourth arm is connected to the portion of the adjustment member fixed to the housing by a connection ridge with hinging capability, and the fourth arm is also connected to the arm by a connection piece with hinging capability.

9. A device as claimed in claim 1, in which the support member has a plate-shaped wall portion and a disc-shaped member fixed relative to the plate-shaped wall portion, characterized in that a slot is provided in the plate-shaped wall portion for accommodating the disc-shaped member, the slot also defining an oblong, finger-shaped member at the level of the disc, this finger-shaped member connected at one end to the remaining portion of the plate-shaped wall portion and, between its ends, with two connection parts which enclose an angle with one another.

10. A device as claimed in claim 9, characterized in that the finger-shaped member is provided with a projecting nose, and an opposing edge of the slot is provided with a projection, the nose extending toward the projection.

11. A device as claimed in claim 9, characterized in that the finger-shaped member has a narrow portion between its free and fixed ends.

12. A device as claimed in claim 2, characterized in that the adjustment member is provided with an arm which extends at least substantially parallel to the direction of movement of the light through the LCD, the arm being coupled at one end to the relevant LCD, the arm capable of being shifted lengthwise and swivelled about a pivot axis perpendicular to the longitudinal direction of the arm.

13. A device as claimed in claim 5, characterized in that the adjustment member is provided with a third arm at the side of the arm, facing away from the second arm, which third arm is connected to the portion of the adjustment member fixedly connected to the housing by a connection ridge forming a pivot, and which third arm is also coupled to the arm the LCD between the ends of arm by means of connecting parts forming part of the adjustment member.

14. A device as claimed in claim 7, characterized in that the third arm is connected to one end of a fourth arm by a connection piece with hinging capability, which fourth arm is situated between the third arm and the arm, while the other end of the fourth arm is connected to the portion of the adjustment member fixed to the housing by a connection ridge with hinging capability, and the fourth arm is also connected to the arm by a connection piece with hinging capability.

15. A device as claimed in claim 2, in which the support member has a plate-shaped wall portion and a disc-shaped member fixed relative to the plate-shaped wall portion, characterized in that a slot is provided in the plate-shaped wall portion for accommodating the disc-shaped member, the slot also defining an oblong, finger-shaped member at the level of the disc, this finger-shaped member is connected at one end to the remaining portion of the plate-shaped wall portion and, between its ends, with two connection parts which enclose an angle with one another.

16. A device as claimed in claim 3, in which the support member has a plate-shaped wall portion and a disc-shaped member fixed relative to the plate-shaped wall portion, characterized in that a slot is provided in the plate-shaped wall portion for accommodating the disc-shaped member, the slot also defining an oblong, finger-shaped member at the level of the disc, this finger-shaped member is connected at one end to the remaining portion of the plate-shaped wall portion and, between its ends, with two connection parts which enclose an angle with one another.

17. A device as claimed in claim 4, in which the support member has a plate-shaped wall portion and a disc-shaped member fixed relative to the plate-shaped wall portion, characterized in that a slot is provided in the plate-shaped wall portion for accommodating the disc-shaped member, the slot also defining an oblong, finger-shaped member at the level of the disc, this finger-shaped member is connected at one end to the remaining portion of the plate-shaped wall portion and, between its ends, with two connection parts which enclose an angle with one another.

18. A device as claimed in claim 5, in which the support member has a plate-shaped wall portion and a disc-shaped member fixed relative to the plate-shaped wall portion, characterized in that a slot is provided in the plate-shaped wall portion for accommodating the disc-shaped member, the slot also defining an oblong, finger-shaped member at the level of the disc, this finger-shaped member is connected at one end to the remaining portion of the plate-shaped wall portion and, between its ends, with two connection parts which enclose an angle with one another.

19. A device as claimed in claim 6, in which the support member has a plate-shaped wall portion and a disc-shaped member fixed relative to the plate-shaped wall portion, characterized in that a slot is provided in the plate-shaped wall portion for accommodating the disc-shaped member, the slot also defining an oblong, finger-shaped member at the level of the disc, this finger-shaped member is connected at one end to the remaining portion of the plate-shaped wall portion and, between its ends, with two connection parts which enclose an angle with one another.

20. A device as claimed in claim 7, in which the support member has a plate-shaped wall portion and a disc-shaped member fixed relative to the plate-shaped wall portion, characterized in that a slot is provided in the plate-shaped wall portion for accommodating the disc-shaped member, the slot also defining an oblong, finger-shaped member at the level of the disc, this finger-shaped member is connected at one end to the remaining portion of the plate-shaped wall portion and, between its ends, with two connection parts which enclose an angle with one another.

21. A device as claimed in claim 8, in which the support member has a plate-shaped wall portion and a disc-shaped member fixed relative to the plate-shaped wall portion, characterized in that a slot is provided in the plate-shaped wall portion for accommodating the disc-shaped member, the slot also defining an oblong, finger-shaped member at the level of the disc, this finger-shaped member is connected at one end to the remaining portion of the plate-shaped wall portion and, between its ends, with two connection parts which enclose an angle with one another.

22. A device as claimed in claim 10, characterized in that the finger-shaped member has a narrow portion between its free and fixed ends.

23. A device as claimed in claim 4, in which the arm is coupled to the second arm with hinging capability near its end remote from the LCD by a connection ridge which forms a pivot.

24. A device as claimed in claim 5, in which the arm is coupled to the second arm with hinging capability near its end remote from the LCD by a connection ridge which forms a pivot.

* * * * *